United States Patent
Kageyama (10) Patent No.: US 8,145,051 B2
(45) Date of Patent: Mar. 27, 2012

(54) IMAGE PICKUP APPARATUS USING LIGHT EMITTING DEVICE AND METHOD OF CONTROLLING THE SAME

(75) Inventor: Takashi Kageyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/862,314

(22) Filed: Aug. 24, 2010

(65) Prior Publication Data

US 2011/0058801 A1    Mar. 10, 2011

(30) Foreign Application Priority Data

Sep. 10, 2009   (JP) ................................. 2009-209363

(51) Int. Cl.
*G03B 15/03* (2006.01)
*G03B 7/26* (2006.01)

(52) U.S. Cl. ........................................ 396/164; 396/205

(58) Field of Classification Search ................. 396/164, 396/205; 348/370–371
See application file for complete search history.

(56) References Cited

U.S. PATENT DOCUMENTS

| 5,371,655 | A | * | 12/1994 | Murdock et al. | 362/18 |
| 5,883,474 | A | * | 3/1999 | Kim | 315/241 S |
| 6,498,900 | B1 | * | 12/2002 | Nakata et al. | 396/108 |
| 7,664,388 | B2 | * | 2/2010 | Huang | 396/199 |
| 2008/0094498 | A1 | * | 4/2008 | Mori | 348/352 |
| 2008/0231742 | A1 | * | 9/2008 | Kurase | 348/333.01 |
| 2009/0162046 | A1 | * | 6/2009 | Tohyama | 396/157 |
| 2009/0213235 | A1 | * | 8/2009 | Watanabe | 348/208.4 |

FOREIGN PATENT DOCUMENTS

JP    2006-072049    3/2006

* cited by examiner

*Primary Examiner* — Christopher Mahoney
(74) *Attorney, Agent, or Firm* — Cowan, Liebowitz & Latman, P.C.

(57) ABSTRACT

An image pickup apparatus which is capable of reducing possibility of missing a good moment to take a photo and reducing electric power wasted for strobe shooting. The image pickup apparatus is capable of shooting using a strobe. A motion detector detects an amount of motion of an object of which an image is to be picked up. A camera controller sets a target charge voltage level of a main capacitor based on the detected amount of motion of the object.

8 Claims, 6 Drawing Sheets

| CHARGE VOLTAGE LEVEL | PRELIMINARY EMISSION TIME PERIOD | LIGHT EMISSION TABLE |
|---|---|---|
| FULL | 20 | LIGHT EMISSION TABLE A |
| HIGH | 25 | LIGHT EMISSION TABLE B |
| MEDIUM | 30 | LIGHT EMISSION TABLE C |
| LOW | 35 | LIGHT EMISSION TABLE D |

| COLOR TEMPERATURE (K) | TARGET CHARGE VOLTAGE LEVEL CORRECTION VALUE (V) |
|---|---|
| ~ 1000 | -25 |
| 1000 ~ 2000 | -20 |
| 2000 ~ 3000 | -15 |
| 3000 ~ 4000 | -10 |
| 4000 ~ 5000 | -5 |
| 5000 ~ | 0 |

IMAGE PICKUP APPARATUS USING LIGHT EMITTING DEVICE AND METHOD OF CONTROLLING THE SAME

BACKGROUND OF THE INVENTION

1. Field of the Invention

The present invention relates to an image pickup apparatus, such as a digital camera, which can perform shooting using a light emitting device for irradiating an object, and a method of controlling the image pickup apparatus.

2. Description of the Related Art

Photo shooting includes daylight shooting which is performed under sunlight in the day, so-called strobe shooting which is performed by emitting flashlight toward an object in the dark, and so-called daylight synchro shooting which is performed with a combination of daylight and flashlight. Thus, the photo shooting is performed under various conditions.

As a method of lighting control for strobe shooting, there has been known a pre-flash method. In the pre-flash method, a strobe is preliminarily flashed before exposure for shooting, and an amount of light emission appropriate for actual shooting is calculated by measuring an amount of reflected light from an object obtained by the pre-flash, whereafter a main flash is emitted according to the calculated light emission amount. In this case, in a digital camera having no light metering sensor, an image sensor for image pickup is exposed to reflected light obtained by the pre-flash, and an image signal generated thereby is used for light metering.

In flashing the strobe, a main capacitor is electrically charged in advance, and then in light emission timing, a voltage is applied to a xenon tube while energizing a trigger coil. In doing this, generally, the light emission control is started after the main capacitor is electrically charged to a target charge voltage level (full charge) close to its rated voltage. This is because it is convenient to make constant the amount of preliminary light emission by emitting a pre-flash in a state of the main capacitor charged to the predetermined voltage level and thereby calculate an amount of main light emission to be effected by a main flash based on a photometric value of reflected light obtained by the pre-flash.

However, it takes time to charge the main capacitor to the full, and hence there is a problem that while viewing a scene which requires strobe light illumination, a good moment to take a photo of the scene can be missed. Further, the inflexibility of the charge control method that charges the main capacitor to the full even when only a relatively small light emission amount suffices causes waste of electric power.

To solve these problems, a technique has been proposed in which the main capacitor is charged only by a charge amount enough to obtain a light amount determined on a shooting mode-by-shooting mode basis (see Japanese Patent Laid-Open Publication No. 2006-072049). This proposal asserts that electric power wastefully consumed for strobe shooting can be reduced while maintaining an appropriate amount of light emission adapted to each of various scenes to be shot.

However, the amount of strobe light emission required for shooting is different between different situations of objects at different times, and therefore according to the technique disclosed in Japanese Patent Laid-Open Publication No. 2006-072049, it is difficult to define an appropriate amount of strobe light emission on a shooting mode-by-shooting mode basis.

SUMMARY OF THE INVENTION

The present invention provides an image pickup apparatus which is capable of reducing possibility of missing a good moment to take a photo and reducing electric power wasted for strobe shooting, and a method of controlling the image pickup apparatus.

In a first aspect of the present invention, there is provided an image pickup apparatus which is capable of shooting using a light emitting unit including a light source, and a capacitor unit that stores electric energy for causing the light source to emit light, comprising an image pick-up unit configured to pick up an image of an object, an acquisition unit configured to acquire information on an amount of motion of the object, and a setting unit configured to set a target charge control value for the capacitor, based on the information on the amount of motion of the object acquired by the acquisition unit.

In a second aspect of the present invention, there is provided a method of controlling an image pickup apparatus which is capable of shooting using a light emitting unit including a light source, and a capacitor unit that stores electric energy for causing the light source to emit light, comprising acquiring information on an amount of motion of an object of which an image is to be picked up, and setting a target charge control value for the capacitor, based on the acquired information on the amount of motion of the object.

According to the present invention, it is possible to reduce the possibility of missing a good moment to take a photo, as well as to reduce electric power wasted for strobe shooting.

Further features of the present invention will become apparent from the following description of exemplary embodiments with reference to the attached drawings.

DETAILED DESCRIPTION OF THE EMBODIMENTS

The present invention will now be described in detail below with reference to the accompanying drawings showing embodiments thereof.

Figure 1:
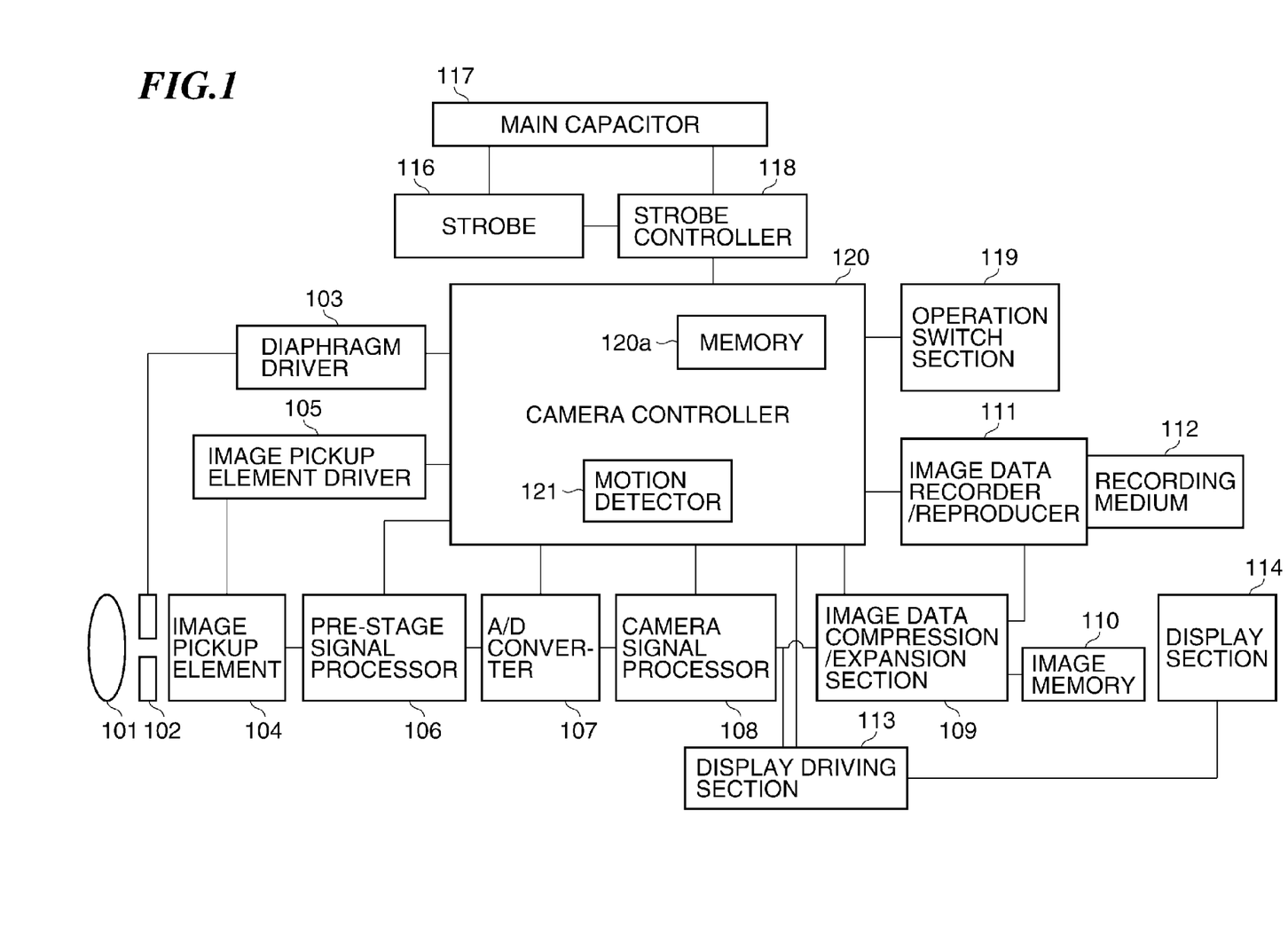
FIG. 1 is a block diagram of an image pickup apparatus according to a first embodiment of the present invention.

FIG. 1 is a block diagram of an image pickup apparatus according to a first embodiment of the present invention.

In FIG. 1, reference numeral 102 denotes a diaphragm mechanism that also serves as a shutter and limits the amount of light which is incident from a photographic lens 101 and is permitted to pass therethrough. A diaphragm driver 103 drives the diaphragm mechanism 102. An image pickup element driver 105 drives an image pickup element 104, such as a CMOS sensor. A pre-stage signal processor 106 controls the amplification of a signal output from the image pickup element 104 according to correlated double sampling (CDS) and a sensitivity setting. An analog-to-digital converter 107 performs analog-to-digital conversion of a signal output from the pre-stage signal processor 106 to form a digitized signal. A camera signal processor 108 performs automatic white balance processing, contour emphasis processing, and the like processing on the digitized signal from the analog-to-digital converter 107, to thereby convert the digitized signal to image data.

An image data compression/expansion section 109 compresses or expands image data and outputs compressed or expanded image data to an image memory 110 or an image data recorder/reproducer 111. The image data recorder/reproducer 111 records the compressed image data on a recording medium 112, such as a semiconductor memory, or reproduces image data from the same. A display driver 113 drives a display section 114 implemented e.g. by a liquid crystal display or a CRT display. A main capacitor 117 is an example of a capacitor unit in the present invention, which stores electric power for causing a strobe 116 as a light emitter to emit light.

A strobe controller 118 performs charge control for the main capacitor 117 and light emission control for the strobe 116. On an operation switch section 119, there are arranged a shutter button, not shown, which generates a recording start trigger and the like. A camera controller 120 is implemented e.g. by a MPU and controls the overall operation of the image pickup apparatus. The camera controller 120 includes a memory 120a for storing lighting control settings and the like, and a motion detector 121 that detects motion of an object of which an image is to be picked up.

Next, a description will be given of the operation of the image pickup apparatus constructed as above.

A luminous flux having passed through the photographic lens 101 is controlled by the diaphragm mechanism 102 such that appropriate exposure can be obtained, and is subjected to photoelectric conversion by the image pickup element 104. A charge accumulation time period over which electric charge is accumulated in the image pickup element 104 is controlled by the image pickup element driver 105. A signal output from the image pickup element 104 is subjected to correlated double sampling (CDS) and gain control by the pre-stage signal processor 106, and is then to analog-to-digital conversion by the analog-to-digital converter 107.

The camera signal processor 108 performs automatic white balance processing, contour emphasis processing, and the like processing on the digitized signal. The signal processed by the camera signal processor 108 is delivered to the camera controller 120, and the camera controller 120 performs feedback control based on the signal.

The motion detector 121 in the camera controller 120 is an arithmetic circuit for detecting a position change (motion) of an object based on sequentially received image signals and outputting the magnitude and speed of the position change. The camera controller 120 determines an amount of motion (an amount of the position change) based on information output from the motion detector 121. The camera controller 120 controls the diaphragm driver 103, the image pickup element driver 105, and the pre-stage signal processor 106 such that the signal input through the above-described diaphragm control, charge accumulation time control and gain control, to the camera controller 120 has an appropriate value.

In a recording mode, the signal processed by the camera signal processor 108 is delivered to the display driver 113, and a picked-up image (live image) is displayed on the display section 114 on a real-time basis. When the recording start trigger is input via the operation switch section 119 at this time point, the camera controller 120 performs a shooting process as described hereafter: The camera controller 120 causes the diaphragm driver 103 to set the diaphragm mechanism 102 to an aperture value (i.e. f number) for shooting, and sets the pre-stage signal processor 106 to a sensitivity for shooting.

Then, the camera controller 120 set a charge accumulation time period upon the lapse of which the diaphragm driver 103 is to cause the diaphragm mechanism 102 to perform a shutter operation for completely closing the aperture. Then, the camera controller 120 causes the exposure of the image pickup element 104 to be performed over the set charge accumulation time period, and upon the lapse of the charge accumulation time period, the diaphragm mechanism 102 completely closes the aperture, whereby light is blocked.

A video signal read out during blocking of light is analog-to-digital converted by the analog-to-digital converter 107, and is then supplied to the image data compression/expansion section 109 via the camera signal processor 108. The image data compression/expansion section 109 temporarily stores image data in the image memory 110, and sequentially outputs the image data to the image data recorder/reproducer 111 after compressing the image data into the JPEG format or the like, whereby the image data is recorded on the recording medium 112, such as a semiconductor memory.

When illumination is not sufficient for photographing an object or when a strobe shooting mode is set, so-called strobe shooting is performed in which the strobe 116 is caused to emit light by an appropriate light emission amount in timing synchronous with the exposure performed in the above-described shooting process. The strobe shooting process will be described in detail hereinafter.

In a reproduction mode, image data is read from the recording medium 112 by the image data recorder/reproducer 111, and is then supplied to the image data compression/expansion section 109. The image data is expanded by the image data compression/expansion section 109 and is temporarily stored in the image memory 110, followed by being supplied to the display driver 113 and reproduced as an image by the display section 114.

Figure 2:
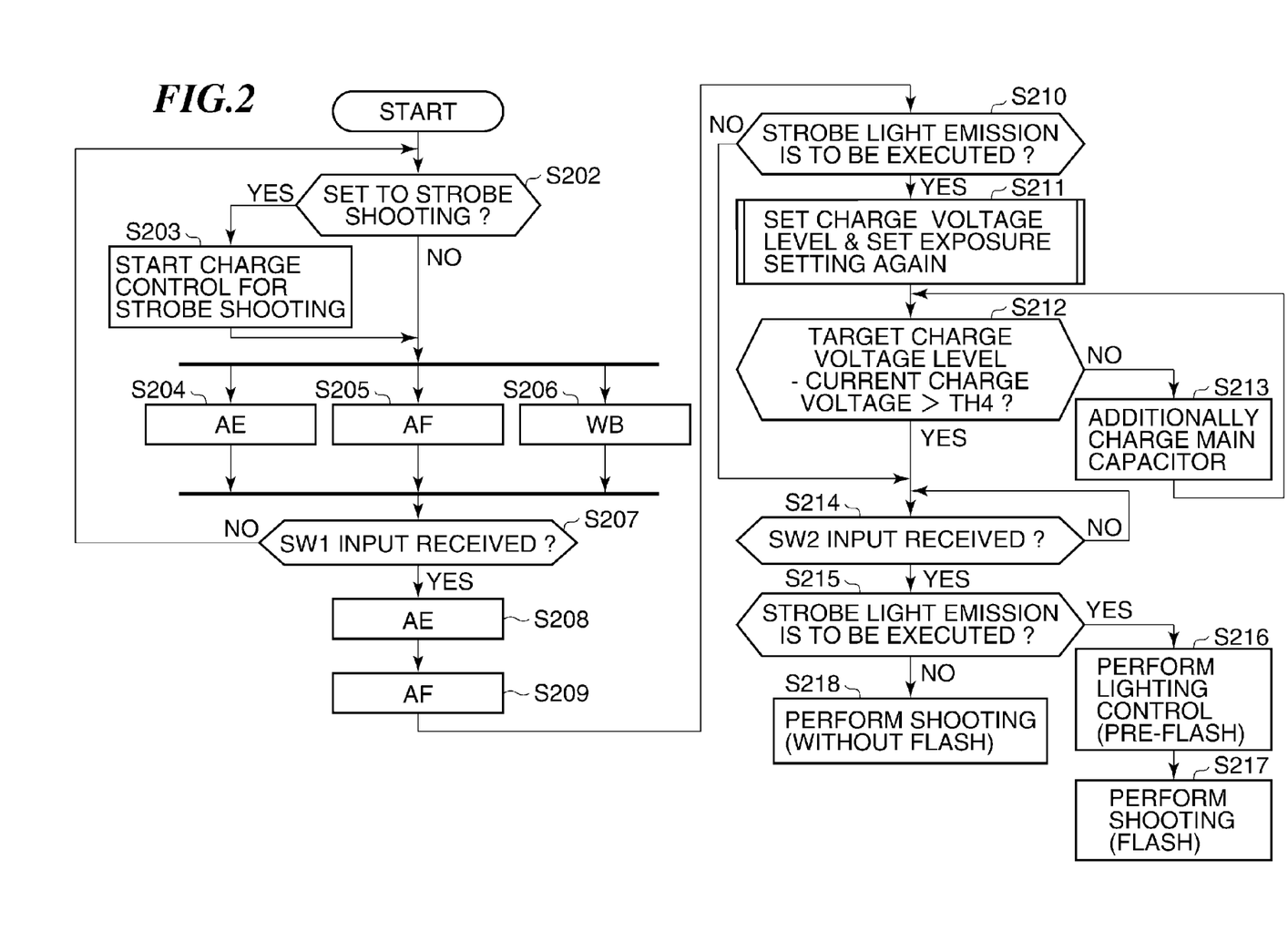
FIG. 2 is a flowchart of a strobe shooting process performed by the image pickup apparatus.

FIG. 2 is a flowchart of the strobe shooting process performed by the image pickup apparatus of the present embodiment. Steps in FIG. 2 are executed by the camera controller 120 by loading an associated program stored e.g. in a ROM, not shown, into a RAM, not shown.

It is assumed that at the start of the FIG. 2 process, a power switch, not shown, and the like of the image pickup apparatus have been turned on and the startup of the camera system has been completed. When the system startup is executed, the camera controller 120, the image pickup element 104, the image memory 110, and so forth start respective operations. Then, upon completion of the system startup, a live image is displayed on the display section 114, and the image pickup apparatus enters a standby state for receiving a recording start trigger from the operation switch section 119 (i.e. a shooting standby state). At this time, the user is allowed to configure settings concerning shooting, using operation buttons of the operation switch section 119. The user can configure settings for enabling/disabling strobe shooting, forcible strobe light emission, etc.

In a step S202, the camera controller 120 determines, according to a strobe setting configured by the user, whether or not strobe shooting is to be performed. If strobe shooting is to be performed, the camera controller 120 proceeds to a step S203, whereas if not, the same proceeds to steps S204 to S206.

In the step S203, the camera controller 120 causes the strobe controller 118 to start charge control of the main capacitor 117, and then proceeds to the steps S204 to S206.

In the steps S204 to S206, the camera controller 120 performs auto exposure (AE) processing, autofocus (AF) processing, and white balance (WB) processing to thereby repeatedly carry out feedback control of exposure, focus, and color correction such that a live image can be displayed with appropriate exposure, focus, and color, and then proceeds to a step S207.

In the step S207, the camera controller 120 checks whether or not an SW1 input as a shooting preparation instruction has been received from the operation switch section 119. If the SW1 input has not been received, the camera controller 120 returns to the step S202, whereas if the SW1 input has been received, the camera controller 120 proceeds to a step S208.

In the step S208, the camera controller 120 executes auto exposure processing for shooting to thereby set exposure, and then proceeds to a step S209.

In the step S209, the camera controller 120 executes autofocus processing for shooting, and then proceeds to a step S210.

In the step S210, the camera controller 120 determines whether or not strobe light emission is to be executed. This determination is performed based on various criteria. For example, in a state set to the forcible strobe light emission, the camera controller 120 always determines that strobe light emission is to be executed, and in other states enabling strobe light emission than the state set to the forcible strobe light emission, the camera controller 120 determines whether or not strobe light emission is to be executed, according to conditions, such as exposure time and backlight determination. Then, if the camera controller 120 determines that strobe light emission is to be executed, the camera controller 120 proceeds to a step S211, whereas if not, the camera controller 120 proceeds to a step S214.

In the step S211, based on information output from the motion detector 121, the camera controller 120 causes the strobe controller 118 to set a target charge voltage level, and sets exposure again to make up for a decrease in a strobe range within which strobe light can reach due to a decrease in the light emission amount to be caused by a pre-flash. Then, the camera controller 120 proceeds to a step S212. The process in the step S211 will be described in detail hereinafter.

In the step S212, the camera controller 120 performs comparison between the target charge voltage level set in the step S211 and the current charge voltage of the main capacitor 117. If shortage of the current charge voltage of the main capacitor 117 with reference to the target charge voltage level is larger than a predetermined threshold value TH4, the camera controller 120 proceeds to a step S213.

In the step S213, the camera controller 120 causes the strobe controller 118 to perform additional charging of the main capacitor 117. The main capacitor 117 is charged until the shortage of the current charge voltage thereof with reference to the target charge voltage level becomes smaller than the threshold value TH4, whereafter the camera controller 120 proceeds from the step S212 to the step S214.

On the other hand, when the shortage of the current charge voltage of the main capacitor 117 with reference to the target charge voltage level is not larger than the predetermined threshold value TH4, the camera controller 120 does not cause the strobe controller 118 to perform additional charging of the main capacitor 117, but directly proceeds to the step S214. The threshold value TH4 may be set to 0, or it may be variable according to the target charge voltage level set in the step S211.

In the step S214, the camera controller 120 determines whether or not a shooting instruction trigger input (SW2 input) has been received from the operation switch section 119. If the SW2 input has been received, the camera controller 120 proceeds to a step S215.

In the step S215, the camera controller 120 determines whether or not strobe light emission is to be executed. If strobe light emission is to be executed, the camera controller 120 proceeds to a step S216, whereas if not, the camera controller 120 proceeds to a step S217.

In the step S216, the camera controller 120 performs lighting control, and then proceeds to a step S218. In the lighting control, first, photometric measurement of ambient light is executed. Then, the strobe 116 is preliminarily flashed by a predetermined light emission amount under the control of the strobe controller 118, to thereby perform photometric measurement of reflected light of the strobe light emission. Based on a measured photometric value of ambient light and a measured photometric value of a pre-flash, an appropriate light emission amount for actual shooting is determined. The lighting control will be described in detail hereinafter.

In the step S218, the camera controller 120 performs actual shooting by exposure using a shutter operation for closing the aperture of the diaphragm mechanism 102. In synchronism with the exposure, the camera controller 120 causes the strobe controller 118 to flash the strobe 116 by the light emission amount determined in the step S216. This completes the strobe shooting.

In the step S217, the camera controller 120 performs actual shooting without flashing the strobe 116, to thereby complete shooting.

It often occurs, as in the case of performing strobe shooting in rapid succession, that at a time point when the SW1 input is received in the step S207, the main capacitor 117 is not in a state charged to the full charge voltage level. Therefore, the main capacitor 117 is additionally charged in the step S213 after reception of the SW1, and only after the charging of the main capacitor 117 to the full charge voltage level is completed, the camera controller 120 enters the standby state for receiving the SW2 input in the step 214. In this case, there is a possibility that a good moment to take a photo is missed because completion of the charging of the main capacitor 117 to the full charge voltage level has to be waited for. In the present embodiment, this possibility is reduced by changing the target charge voltage level in the step S211 according to the state of an object.

Figure 3:
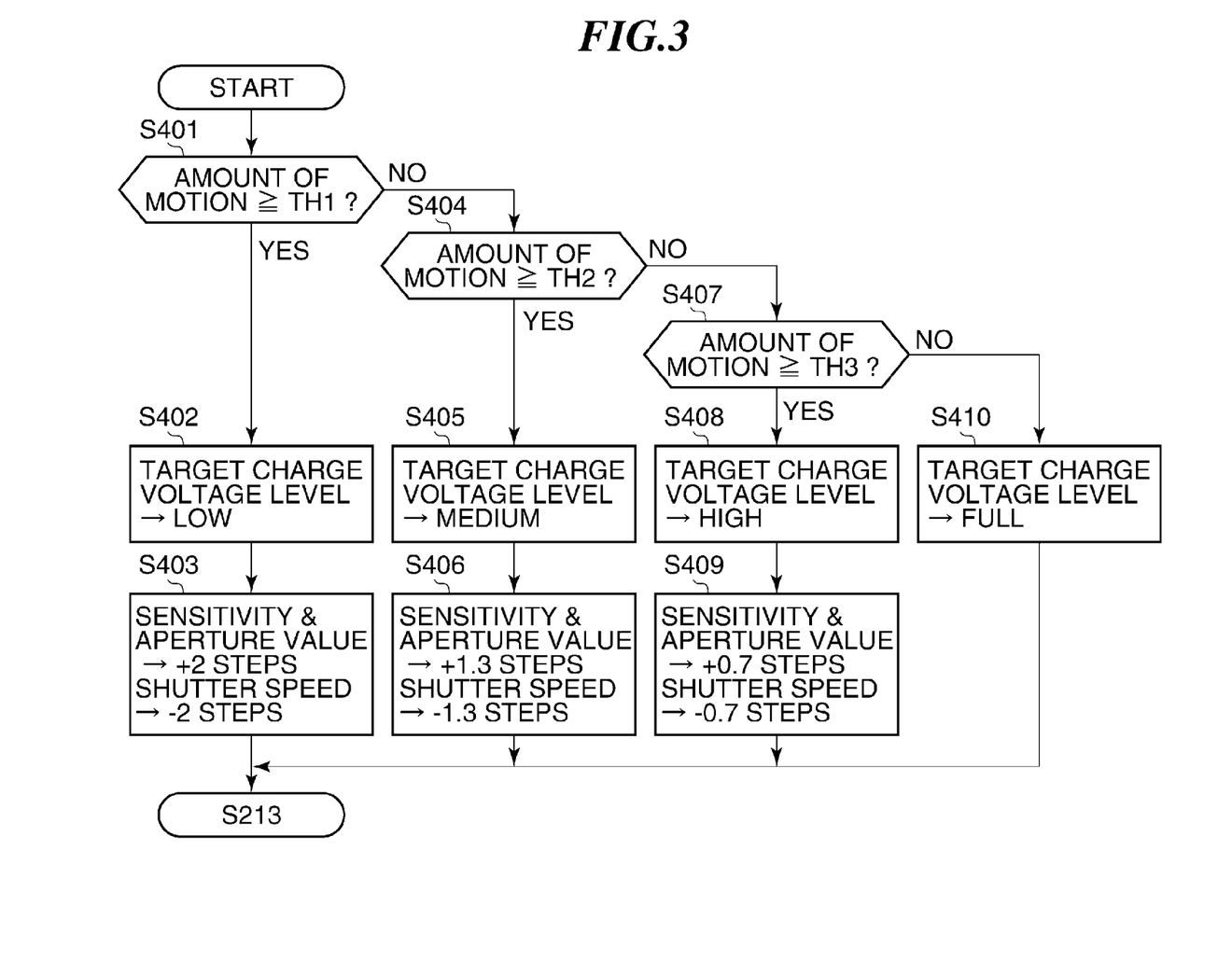
FIG. 3 is a flowchart of a process for setting a target charge voltage level and setting exposure again, which is executed in a step in FIG. 2.

FIG. 3 is a flowchart of a process for setting the target charge voltage level and setting exposure again, which is executed in the step S211 in FIG. 2. In the present embodiment, a first threshold value TH1, a second threshold value TH2, and a third threshold value TH3 of the amount of motion are in the relationship of TH1>TH2>TH3. The amount of motion is expressed in a numerical value which represents information on the magnitude of a position change of an object occurring between successive image data items output from the motion detector 121.

The method of determining the numerical value is not particularly limited, but there may be employed a method of extracting only the amount of motion of a main object to which attention is being paid, a method of extracting amounts of motions of respective portions in an entire image and calculating an average of the extracted amounts by weighting them, or a method of extracting amounts of motions of respective portions in an entire image and determining the largest value of the extracted amounts. As a further alternative, the numerical value may be derived with an algorithm other than the above.

When the amount of motion of an object is large, it can be presumed that the state of the object is changing moment by moment. Therefore, in order to seize a decisive moment to take a photo, as the waiting time for completion of the charging of the main capacitor 117 is shorter, it is more preferable.

Referring to FIG. 3, in a step S401, the camera controller 120 determines whether the amount of motion output from the motion detector 121 is not smaller than the largest threshold value TH1. If the amount of motion is not smaller than the threshold value TH1, the camera controller 120 judges that the amount of motion of the object is very large, and proceeds to a step S402. On the other hand, if the amount of motion is smaller than the threshold value TH1, the camera controller 120 proceeds to a step S404.

In the step S402, the camera controller 120 sets the target charge voltage level to "LOW" which is selected from "FULL", "HIGH", "MEDIUM", and "LOW", and proceeds to a step S403. When light emission is performed in a state where the charge voltage of the main capacitor 117 is not sufficiently high, the maximum light emission amount becomes relatively low.

In the step S403, the camera controller 120 changes settings of the sensitivity, the aperture value, and the shutter speed, such that a light emission amount of a flash emitted when the main capacitor 117 is in a charge voltage level of "LOW" can meet a condition required for a predetermined strobe range defined for the image pickup apparatus, within which strobe light reaches, and then proceeds to the step S212 in FIG. 2.

An amount of change in exposure effect (hereinafter referred to as "an exposure effect change amount) caused by the above-mentioned changes in the settings of the sensitivity and the aperture value corresponds to the target charge voltage level set in the step S402. In the present embodiment, in the case of the target charge voltage level being "LOW", the exposure effect change amount caused by these changes in the settings is set to e.g. +2 steps in terms of exposure amount setting. More specifically, the settings of the sensitivity and the aperture value are changed such that the sensitivity is made higher and the aperture is made wider than when the charge voltage level is set to "FULL" so as to make an image to be obtained by exposure brighter by a degree corresponding to an increase of 2 steps in exposure amount setting. Further, the setting of the shutter speed is changed such that an exposure effect change amount caused by the change in the setting becomes equal in absolute value to the above-mentioned exposure effect change amount caused by the changes in the settings of the sensitivity and the aperture value but opposite in sign (i.e. in the direction of change) thereto, i.e. toward a higher speed side, in short, is set to e.g. –2 steps in terms of exposure amount setting. More specifically, the setting of the shutter speed is changed such that the shutter speed is made higher than when the charge voltage level is set to "FULL" so as to make the image to be obtained by exposure darker by a degree corresponding to a decrease of 2 steps in terms of exposure amount setting. As a consequence, while maintaining the strobe range, the amount of ambient light to be taken in is not changed, so that it is possible to maintain the result obtained by the auto exposure processing executed in the step S208.

In the step S404, the camera controller 120 determines whether the amount of motion output from the motion detector 121 is not smaller than the threshold value TH2 which is smaller than the threshold value TH1. If the amount of motion is not smaller than the threshold value TH2, the camera controller 120 proceeds to a step S405, whereas if the amount of motion is smaller than the threshold value TH2, the camera controller 120 proceeds to a step S407.

In the step S405, the camera controller 120 sets the target charge voltage level to "MEDIUM" selected from "FULL", "HIGH", "MEDIUM", and "LOW", and proceeds to a step S406.

In the step S406, the camera controller 120 changes the settings of the sensitivity, the aperture value, and the shutter speed, such that a light emission amount of a flash emitted when the main capacitor 117 is in a charge voltage level of "MEDIUM" can meet the condition required for the predetermined strobe range defined for the image pickup apparatus, within which strobe light reaches, and then proceeds to the step S212 in FIG. 2. In this case, an exposure effect change amount caused by the changes in the settings of the sensitivity and the aperture value is set to +1.3 steps in terms of exposure amount setting, and an exposure effect change amount caused by the change in the setting of the shutter speed is set to –1.3 steps in terms of exposure amount setting.

In the step S407, the camera controller 120 determines whether the amount of motion output from the motion detector 121 is not smaller than the threshold value TH3 which is smaller than the threshold value TH2. If the amount of motion is not smaller than the threshold value TH3, the camera controller 120 proceeds to a step S408, whereas if the amount of motion is smaller than the threshold value TH3, the camera controller 120 proceeds to a step S410.

In the step S408, the camera controller 120 sets the target charge voltage level to "HIGH" selected from "FULL", "HIGH", "MEDIUM", and "LOW", and proceeds to a step S409.

In the step S409, the camera controller 120 changes the settings of the sensitivity, the aperture value, and the shutter speed, such that a light emission amount of a flash emitted when the main capacitor 117 is in a charge voltage level of "HIGH" can meet the condition required for the predetermined strobe range defined for the image pickup apparatus, within which strobe light reaches, and then proceeds to the step S212 in FIG. 2. In this case, an exposure effect change amount caused by the changes in the settings of the sensitivity and the aperture value is set to +0.7 steps in terms of exposure amount setting, and an exposure effect change amount caused by the change in the setting of the shutter speed is set to –0.7 steps in terms of exposure amount setting.

In the step S410, the camera controller 120 sets the target charge voltage level to "FULL" selected from "FULL", "HIGH", "MEDIUM", and "LOW", and proceeds to the step S212 in FIG. 2 without changing the settings of the sensitivity, the aperture value, and the shutter speed.

Although in the present embodiment, the three threshold values are used to switch the target charge voltage level, the number of the threshold values is not limited to three, and it is also possible to set the target charge voltage level by calculation, without using fixed threshold values. In this case, it is only required that the larger the amount of motion of an object, the lower the target charge voltage level is set.

Figure 4:
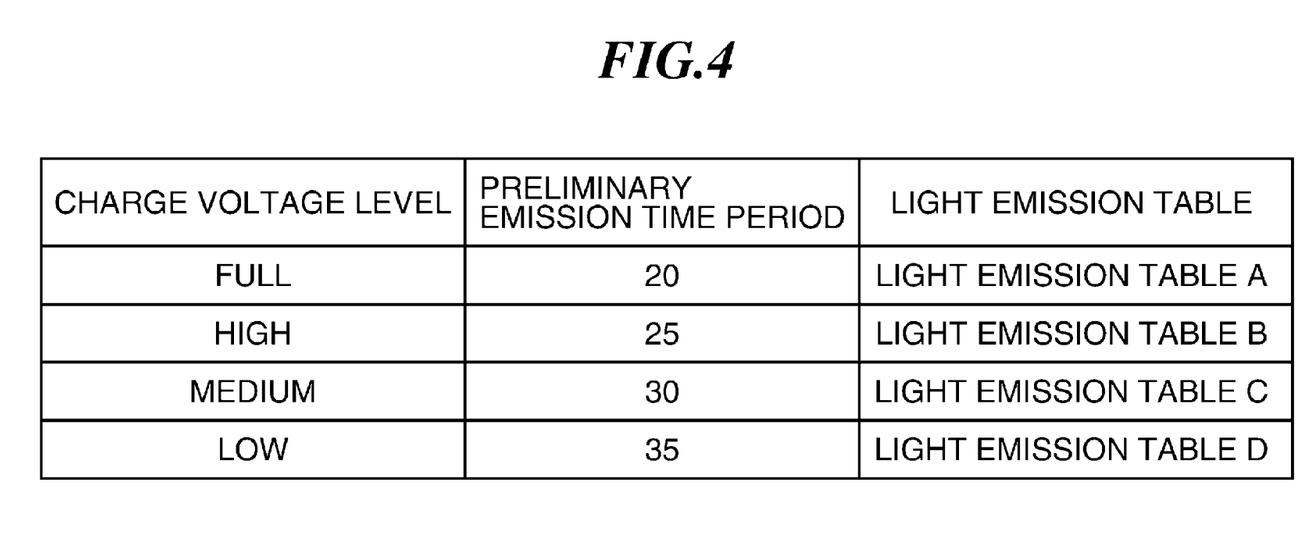
FIG. 4 is a diagram useful in explaining an example of lighting control executed in a step in FIG. 2.

FIG. 4 is a diagram useful in explaining an example of lighting control executed in the step 216 in FIG. 2.

In the present embodiment, a system is assumed which is not capable of measuring the light emission amount of the strobe 116, but defines the light emission amount by specifying a light emission time period. If strobe shooting is performed, as in the prior art, with the main capacitor 117 charged to a predetermined full charge voltage level, it is possible to constantly emit light by substantially the same light emission amount by preliminarily flashing the strobe 116 over a predetermined emission time period.

Therefore, an index value indicative of an appropriate amount of light to be emitted with respect to a preliminary light emission amount can be obtained by comparing between a photometric value obtained by photometric measurement of an object illuminated only with ambient light without a flash and a photometric value obtained by photometric measurement of the object illuminated with both ambient light and a flash by preliminarily flashing the strobe 116 by a predetermined light emission amount. A light emission time period required to realize the light emission amount indicated by the index value is determined by referring to a light emission table stored in the memory 120a in advance.

The light emission table is referred to so as to determine a light emission time period for realizing a desired light emission amount in a state of the main capacitor 117 in which the charge voltage thereof is at a level assumed when the strobe 116 has been preliminarily flashed by the predetermined light emission amount after the main capacitor 117 being charged to the full charge voltage level. In the present embodiment, since the charge voltage level of the main capacitor 117 is different at different times, it is required to store a plurality of light emission tables and selectively use one of the light emission tables according to a charge voltage level at a time point when a flash (light emission) is needed.

In doing this, a light emission table is selected not based on the target charge voltage level set in the step S402, S405, S408, or S410, but based on the current charge voltage level.

When a plurality of light emission tables are stored, it is possible to use a different preliminary light emission amount (preliminary light emission time period) according to a different light emission table. FIG. 4 shows an example of this. The preliminary light emission time period may be constant independently of the charge voltage level of the main capacitor 117. A light emission table is prepared by measuring the relationship between a light emission time period and a light emission amount of a flash to be emitted when the main capacitor is at a predetermined charge voltage level. However, if the system is provided, for example, with a circuit for measuring the light emission amount and stopping the light emission at a moment when the light emission amount reaches a desired amount, and is capable of determining the light emission amount of the strobe 116 by a method other than the light emission time period control, it is not required to use the light emission tables.

An image signal acquired by strobe shooting is subjected to automatic white balance processing, contour emphasis processing, and the like processing by the camera signal processor 108. Further, the camera signal processor 108 measures a luminance level of an image signal generated by shooting and performs luminance correction processing, including applying a gamma curve and making the luminance of a main object closer to an appropriate level. This processing makes it possible to correct the luminance of an object such that it becomes closer to an appropriate luminance level even when the threshold value TH4 applied in the step S212 in FIG. 2 is other than 0 or when the charge voltage level of the main capacitor 117 is different from a charge voltage level at a time of preparation of the light emission tables.

As described above, according to the present embodiment, urgency of a good moment to take a photo is determined based on the amount of motion of an object, and the target charge voltage level and the settings of the sensitivity and the aperture value are changed. This makes it possible to reduce the possibility of missing the moment to take a photo, as well as to reduce electric power wasted for strobe shooting.

Next, an image pickup apparatus according to a second embodiment of the present invention will be described with reference to FIGS. 5 and 6. It should be noted that duplicate description of components corresponding to those in the first embodiment is omitted by denoting them using the same reference numerals, and only different points from the first embodiment will be described.

Figure 5:
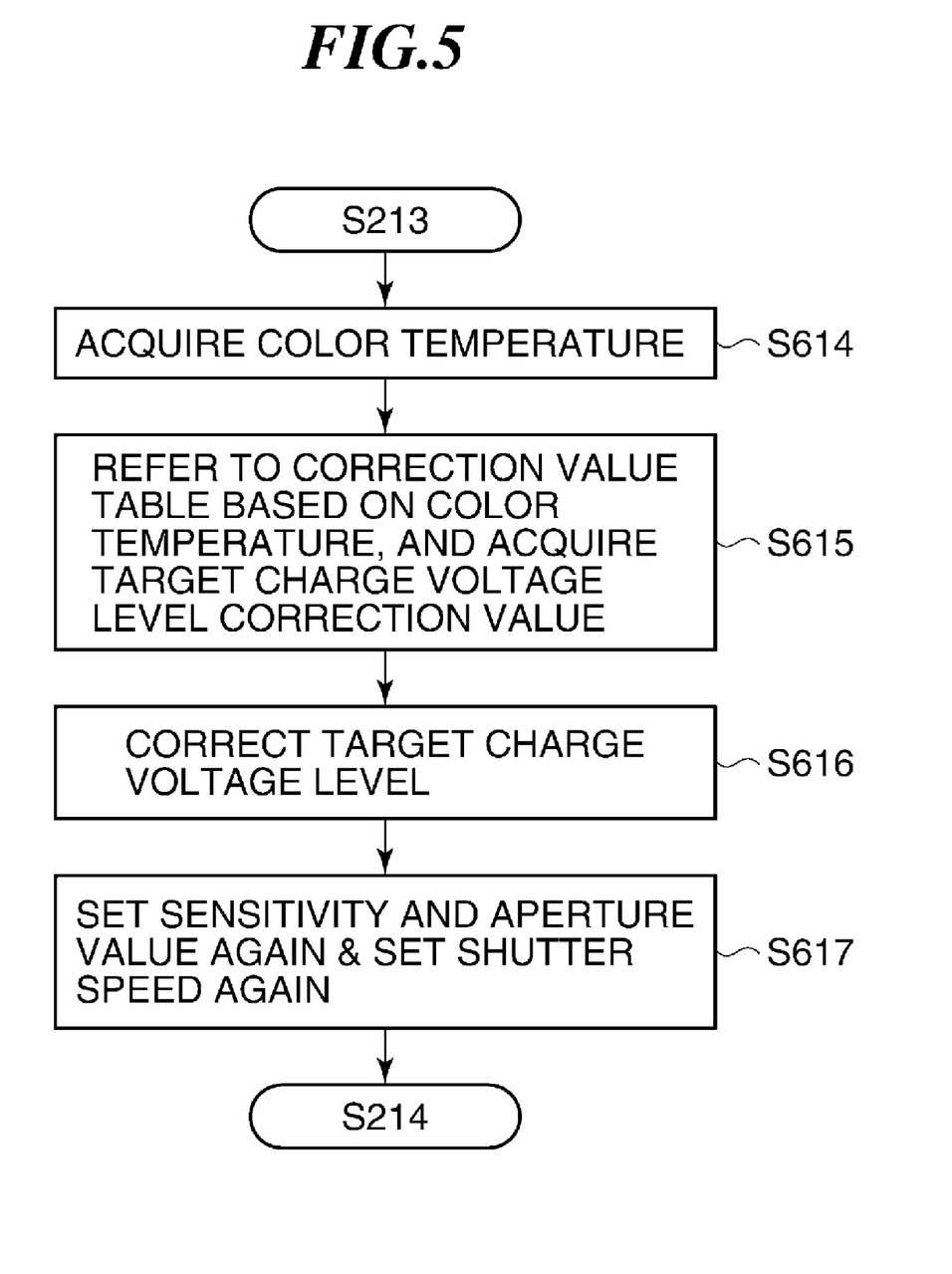
FIG. 5 is a flowchart of a strobe shooting process performed by an image pickup apparatus according to a second embodiment of the present invention.

In the present embodiment, as shown in FIG. 5, steps S614 and S617 are additionally executed between the steps S212 and S214 in FIG. 2.

In a step S614, the camera controller 120 acquires color temperature information on an object from the camera signal processor 108, and then proceeds to a step S615. The color temperature information acquired in the step S614 may be color temperature information that the camera signal processor 108 has acquired by performing signal processing on the digitized signal received from the analog-to-digital converter 107, for the purpose of white balance correction, which is executed in the step 206. Alternatively, color temperature information directly obtained from ambient light using a sensor, not shown, provided for measurement of color temperature may be used.

In the step S615, the camera controller 120 acquires a target charge voltage level correction value from a correction table stored in advance e.g. in the memory 120a, based on the color temperature information acquired in the step S614, and proceeds to a step S616.

Figure 6:
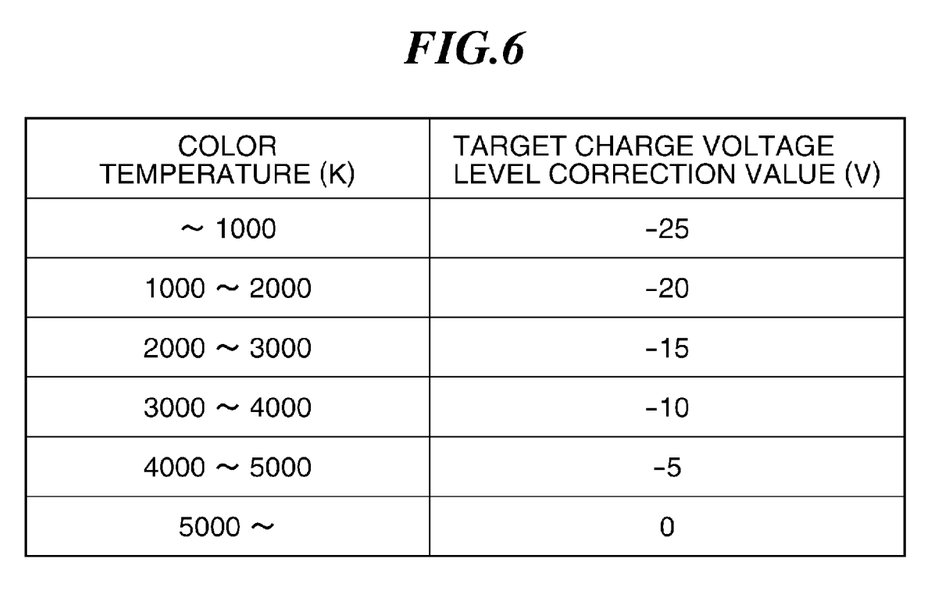
FIG. 6 is a diagram showing an example of a correction table for determining a target charge voltage level correction value.

FIG. 6 is a diagram showing an example of the correction table for acquiring a target charge voltage level correction value.

When the color temperature of ambient light is low, it is preferable to make the most of the color atmosphere of the ambient light and control the light emission amount of the strobe 116 to a low level. Therefore, when the color temperature of ambient light is low, the charge voltage level of the main capacitor 117 may be lower than when the color temperature is high. For this reason, as the color temperature of an object is lower, the target charge voltage level is corrected to a lower value.

In the step S616, the camera controller 120 corrects the target charge voltage level determined in the step S211 in FIG. 2 by the target charge voltage level correction value acquired in the step S615, and then proceeds to a step S617.

In the step S617, the camera controller 120 reconfigures the settings of the sensitivity, the aperture value, and the shutter speed so as to secure the strobe range within which strobe light reaches, and then proceeds to the step S214 in FIG. 2. It should be noted that the exposure setting processing in the steps S403, S406, and S409 may be omitted and be collectively executed in the step S617. The other construction and the advantageous effects are the same as those of the above-described first embodiment.

The present invention is not limited to the above-described embodiments, but it can be practiced in various forms, without departing from the spirit and scope thereof. For example, although in the above-described embodiments, the strobe built in the image pickup apparatus is used as a light emitting device, an external strobe detachably attached to the image pickup apparatus may be employed. In this case, it is only required that the image pickup apparatus sets the target charge voltage level of the external strobe according to the amount of motion and the color temperature of an object detected by the image pickup apparatus itself, and a strobe controller provided in the external strobe performs charge control according to the set target charge voltage level.

Furthermore, although in the above-described embodiments, as a target charge control value which is changed according to the amount of motion of an object of which an image is to be picked up, the target charge voltage level is used, this is not limitative, but instead of changing the target charge voltage level, a target charging time period or a target amount of electric charge or any other suitable target charge control value may be changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-209363, filed Sep. 10, 2009, which is hereby incorporated by reference herein in its entirety.

What is claimed is:

1. An image pickup apparatus which is capable of shooting using a light emitting unit including a light source, and a capacitor unit that stores electric energy for causing the light source to emit light, comprising:
   an image pick-up unit configured to pick up an image of an object;
   an acquisition unit configured to acquire information on an amount of motion of the object; and
   a setting unit configured to set a target charge control value for the capacitor, based on the information on the amount of motion of the object acquired by said acquisition unit,
   wherein the target charge control value is set to a smaller value as color temperature of the object is lower.

2. The image pick-up apparatus according to claim 1, wherein said setting unit sets the target charge control value to a smaller value as the amount of motion of the object is larger.

3. The image pick-up apparatus according to claim 1, comprising a charge control unit configured to perform charging of the capacitor until the target charge control value is reached.

4. The image pick-up apparatus according to claim 1, comprising an exposure setting unit configured to set exposure for shooting such that a predetermined strobe range within which strobe light reaches is attained when the light source is caused to emit light after the capacitor is charged until the target charge control value is reached.

5. The image pick-up apparatus according to claim 1, wherein the target charge control value is a target charge voltage level of the capacitor.

6. The image pick-up apparatus according to claim 1, wherein the target charge control value is a target charging time period over which the capacitor is charged.

7. The image pick-up apparatus according to claim 1, wherein the target charge control value is a target amount of electric charge with which the capacitor is charged.

8. A method of controlling an image pickup apparatus which is capable of shooting using a light emitting unit including a light source, and a capacitor unit that stores electric energy for causing the light source to emit light, comprising:
   acquiring information on an amount of motion of an object of which an image is to be picked up; and
   setting a target charge control value for the capacitor, based on the acquired information on the amount of motion of the object,
   wherein the target charge control value is set to a smaller value as color temperature of the object is lower.

* * * * *